United States Patent [19]

Ledoux et al.

[11] Patent Number: 4,581,344

[45] Date of Patent: Apr. 8, 1986

[54] CATALYSTS FOR THE HYDROTREATMENT OF HYDROCARBONS AND THEIR PREPARATION

[75] Inventors: Marc-Jacques Ledoux, Strasbourg-Robertsau; Gilbert Maire, Haguenau; Ramdane Benazouz; Giorgio Agostini, both of Strasbourg, all of France

[73] Assignee: Centre National de la Recherche Scientifique (C.N.R.S.), Paris, France

[21] Appl. No.: 631,569

[22] Filed: Jul. 17, 1984

[30] Foreign Application Priority Data

Jul. 19, 1983 [FR] France .................................. 83 11883

[51] Int. Cl.[4] .......................... B01J 23/10; B01J 23/12; B01J 23/46; B01J 23/74
[52] U.S. Cl. ..................................... 502/304; 502/302; 502/325; 502/332; 502/335; 502/336; 502/337; 502/338
[58] Field of Search ............... 502/300, 302, 304, 325, 502/332, 335, 336, 337, 338

[56] References Cited

U.S. PATENT DOCUMENTS 3,847,836 11/1974 Nicklin et al. ................. 502/325 X
4,092,239 5/1978 Moser ............................. 502/302 X Primary Examiner—W. J. Shine
Attorney, Agent, or Firm—Thomas S. MacDonald; Alan H. MacPherson; Steven F. Caserza

[57] ABSTRACT

The present invention relates to new catalysts for the hydrotreatment of hydrocarbons, their preparation and their application.

The catalyst for the hydrotreatment of hydrocarbons, according to the present invention, incorporates a refractory inorganic support combined with an active phase comprising a layer of uranium oxide and at least one oxide of a Group VIII metal. The active phase comprises a layer of uranium oxide fixed with a homogenous distribution on the said support through the intermediacy of direct —O— bonds resulting from an impregnation of the support with the aid of an ethanolic solution of uranyl acetylacetonate.

15 Claims, No Drawings

CATALYSTS FOR THE HYDROTREATMENT OF HYDROCARBONS AND THEIR PREPARATION

FIELD OF THE INVENTION

The present invention relates to new catalysts for the hydrotreatment of hydrocarbons. In the combined description and claims of the present patent, the term "hydrocarbons" will be applied in a general manner to heavy feedstocks of carbonaeous substances, in particular to the lightly hydrogenated heavy feedstocks, for example heavy oils derived from petroleum or bituminous shales or coal. The invention also relates to the preparation of these catalysts and to the processes for the hydrotreatment of hydrocarbon feedstocks involving the said catalysts.

The hydrotreatment of hydrocarbons in fact comprises several types of reactions, namely hydrocarbon hydrogenation, hydrodenitrogenation, hydrodesulfurization, hydrodeoxygenation and hydrodemetallization. At present, hydrodesulfurization has been very widely studied, mainly because of the fact that the light hydrocarbon fractions which are generally exploited contained sulphur compounds (mercaptans) which had to be removed. These sulfur compounds are, in fact, responsible for a number of major disadvantages, such as the poisoning of downstream reforming catalysts and the release of sulfur oxides during combustion.

The heavy hydrocarbon feedstocks which are, and will increasingly continue to be, exploited, be they heavy oils derived from petroleum, bituminous shales or coal, contain major proportions, up to 3%, of aromatic nitrogen compounds derived from pyridine. These basic products are both poisons for the downstream acid catalytic cracking catalysts and are hazardous products responsible for the formation of nitrogen oxides during combustion. They are, furthermore, themselves carcinogenic.

PRIOR ART

Hitherto, industry got partly rid of these nitrogen compounds by employing conventional desulfurization catalysts, but under the constraint of operating under pressure and temperature conditions which are very severe and consequently detrimental to catalyst lifetime and to process economics.

The present invention is therefore aimed at the development of new hydrotreatment catalysts which are better suited to a good hydrodenitrogenation and hydrodeoxygenation of hydrocarbons, and in particular of the heavy phases, while retaining a good resistance to sulfur and having improved resistance to metallic poisoning.

SUMMARY OF THE INVENTION

The present invention relates to a new catalyst for the hydrotreatment of hydrocrbons which incorporates a refractory inorganic support combined with an active phase comprising on the one hand a layer of uranium oxide and, on the other hand, at least one oxide of a Group VIII metal.

According to an essential feature of the invention, the active phase of the catalyst comprises a layer of uranium oxide fixed with a homogeneous distribution on the support through the intermediacy of direct —O— bonds resulting from an impregnation of the support with the aid of an ethanolic solution of uranyl acetylacetonate.

Other features and advantages of the present invention will become apparent from the reading of the detailed description which follows, in particular with reference to some individual examples which are provided simply for illustration.

DETAILED DESCRIPTION

The refractory inorganic support of the catalyst according to the invention is of a conventional type. It consists, for example, of various varieties of alumina such as γ-alumina, aluminosilicates silicas, silicoaluminas, zeolites, and mixtures of these various products.

According to the present invention, the refractory inorganic support is combined with an active phase incorporating a layer of uranium oxide as base component.

The base component usually employed in the active phase of hydrodesulfurization catalysts is molybdenum, a strategic metal which is generally lacking in a large number of countries. Its replacement with uranium, a metal which is much more common, in particular in France, results in an excellent dehydrodenitrogenation activity of the catalyst. Moreover, the use of uranium, whose atomic volume is greater than that of molbydenum, results in a catalyst endowed with much better resistance to metallic poisoning.

According to the process which is the subject of the present invention, uranium is deposited on the refractory inorganic support by impregnation with an anhydrous ethanolic solution of an organometallic complex, uranyl acetylacetonate. This complex may be obtained very easily and in excellent yields by the reaction of uranyl nitrate $UO_2(NO_3)_2$ with acetyl-acetone $C_5H_8O_2$, and precipitation of the complex by gradual addition of a carbonate, such as potassium carbonate.

If the operation is carried out in the presence of an excess of approximately 10% of acetylacetone, the acetylacetonate is obtained in a yield of over 99%.

Such a method for depositing uranium on the support results in a base active phase of the catalyst which is in the form of an epitaxial layer on the support, very probably a monolayer of uranium oxide fixed to the support by the formation of direct chemical bonds, for example U—O—Al, and with a perfectly homogeneous distribution. If should be noted, moreover, that this good dispersion which is thus obtained results in a major improvement in the stability of the catalyst towards sulfur and consequently in a better resistance of the catalyst to sulfur.

To facilitate the attachment of the monolayer of uranium oxide to the refractory inorganic support, a support bearing acidic hydroxyl groups will be chosen. Use will be made, for example, of γ-alumina which gives excellent results in practice. Advantageously, the support is subjected to a preliminary heat treatment aimed at ensuring its activation and partial dehydration. This treatment may, for example, consist in the particular case of γ-alumina, of an oxidative roasting in air for two hours at a temperature of the order of 600° C.

In accordance with the present invention, this produces catalysts whose active phase contains from 5 to 35% by weight of uranium, based on the total weight of the catalyst.

The uranium in the active phase of the catalyst must, furthermore, be associated with at least one other Group VIII metal, preferably chosen from iron, cobalt, nickel and ruthenium.

The catalyst which is the subject of the present invention preferably contains 0.1 to 10% by weight of iron, cobalt, nickel and/or ruthenium, based on the total weight of the catalyst.

After the fixing of the active uranium phase on the support, drying and roasting, the impregnation with the second metal is then carried out by any suitable method. To implement this second metal fixation it is again possible to have recourse to any method of impregnation which is current in the catalyst field. It is possible, for example, to prepare a catalyst based on nickel and uranium by carrying out a second impregnation with the aid of an anhydrous solution of an organometallic complex, such as nickel acetylacetonate. In practice, a chlorinated hydrocarbon solvent will advantageously be chosen, such as dichloromethane, which makes it possible to ensure good solubilization of the oganometallic complex and, consequently, a satisfactory impregnation.

It is also possible, of course, to carry out the second impregnation by more conventional methods, particularly by the method known as the pore volume method, starting with an aqueous solution of a Group VIII metal nitrate, for example starting from a basic solution of nickel nitrate hydrate. The impregnation is then carried out preferably with vigorous agitation.

In some individual cases, it is preferable to choose the pore volume method for impregnating the second metal starting with its nitrate. This particularly makes it possible to avoid the presence of chlorine in the catalyst, which would thereby be subject to a modification of its acidic properties.

After the second impregnation, the catalyst is dried, for example for one hour at 120° C., and then treated for an additional two hours in air at 500° C.

The catalyst which is the subject of the present invention may additionally contain various dopes incorporated by conventional methods. By way of a simple example, mention will be made of the incorporation of oxides of rare earths, such as cerium and samarium. These dopes will generally be present in a concentration of approximately 0.2 to 2% by weight, based on the total weight of the catalyst.

The present invention also relates to processes for the hydrotreatment of hydrocarbon feedstocks, particularly to heavy feedstocks intended to be denitrogenated. These processes consist in treating the hydrocarbon feedstocks in a conventional manner with hydrogen in the presence of a catalyst as defined above.

By way of simple illustration, some examples will be given below, illustrating the operating conditions for the preparation of catalysts containing, in accordance with the invention, an active phase based on uranium.

EXAMPLE 1

Preparation of uranyl acetylacetonate:

20 grams of uranyl nitrate $UO_2(NO_3)_2$ are dissolved in 25 ml of distilled water at a temperature of 40° C. The solution is phosphorescent yellow. 11 g of acetylacetone are added to this solution. The reaction solution is maintained at 40° C. with stirring (dark red solution) and a stoichiometric quantity of potassium carbonate is gradually added to this red solution. This addition of carbonate is accompanied by a vigorous release of carbon dioxide and the yellow uranyl acetylacetonate complex precipitates as it is being formed, since it is very poorly soluble in water. The product obtained in this way is filtered off, and then washed with water to remove the potassium nitrate and with petroleum ether to remove traces of acetylacetone. Finally, the product is dried by pumping under vacuum. When the operation is carried out in the presence of an excess of approximately 10% of acetylacetone, a yield of over 99% is obtained.

EXAMPLE 2

Preparation of the catalyst $UO_x/Al_2O_3$ ($2 \leq X \leq 3$)

5.4 g of uranyl acetylacetonate are dissolved in 10 ml of absolute ethanol. The catalyst support is prepared separately. 10 g of γ-alumina (Ketjen ®CK 300) are ground and screened into particles of 0.2 to 0.5 mm, and then roasted in air for two hours at 600° C. This produces an alumina with a specific surface of 217 m²/g and a pore volume of 0.62 g/cm³. This alumina is then wetted with 20 ml of absolute ethanol.

The ethanolic solution of uranyl acetylacetonate is then added at 20° C. (rinsing of the receptacle with 2 ml of absolute ethanol) and this mixture is left to stand for approximately 15 hours.

The solvent is then stripped off in a rotary evaporator (35° C., 14 torr) and 16.26 g of a bright yellow-orange powder are recovered. This powder is then dried for one hour in an oven at 120° C., producing 13.64 g of powder which is then placed for two hours in air in a furnace at 500° C. The powder is then removed from the furnace to be rapidly cooled to room temperature. 12.47 g of orange colored $UO_x/Al_2O_3$ catalyst are obtained in this way.

EXAMPLE 3

Preparation of the catalyst $RuO_4$-$UO_x/Al_2O_3$
($2 \leq X \leq 3$)

0.121 g of ruthenium acetylacetonate is dissolved in 20 ml of hot ethanol, and 2.5 g of the $UO_x/Al_2O_3$ catalyst obtaining in example 2 are then added to this solution. The mixture is left to stand for two hours, then the solvent is removed in a rotary evaporator. The powder obtained is then dried for one hour at 120° C., and then treated for two hours in air at 500° C. 2.50 g of catalyst are thus obtained, in the form of a very dark grey, almost black, powder. This catalyst contains approximately 0.2% by weight of $RuO_4$ and 20% by weight of $UO_3$.

EXAMPLE 4

Preparation of the catalyst NiO-$UO_x/Al_2O_3$ ($2 \leq X \leq 3$)

0.7 g of nickel nitrate hydrate is dissolved in 3.5 ml of ammonia water (pH 11). This solution is added with vigorous stirring to 5 g of the $UO_x/Al_2O_3$ catalyst obtained in example 2. The mixture is left to stand for 15 hours, is dried for one hour at 120° C. and then treated for two hours in air at 500° C. 5.11 g of catalyst are thus obtained in the form of a grey-green powder. The catalyst obtained contains approximately 3% by weight of NiO and 19.6% by weight of $UO_3$.

Chemical analyses carried out on a micropilot scale in the laboratory have made it possible to demonstrate an excellent reactivity for the denitrogenation of pyridine and piperidine, and good reactivity for desulfurization of thiophene.

The results of this comparative study are known in Table I below. In this table, the catalysts tested are coded with references which have the following meanings:

| | |
|---|---|
| NX 320 AC<br>NX 412 AC<br>NX 512 AC<br>NX 712 AC | catalysts according to the invention, based on uranium and nickel, prepared by impregnating the support with an ethanolic solution of uranyl acetylacetonate. |
| NiMo(N4)<br>NiMo(N12)<br>NiMo(N7) | conventional catalysts based on nickel and molybdenum. |
| NMX<br>CMX | catalysts according to the invention, doped with molybdenum. |

The HDN activity referred to in Table I corresponds to the pyridine hydrodenitrogenation reaction in the phase containing sulfur. The conditions for the HDN reaction are the following:

The catalyst is placed under 1 atmosphere of $H_2S/H_2$ (2%), a flow of 100 ml/min, then the temperature is raised to 450° C. (pre-sulfurization), it is left for 1 h at 450° C., then cooled to 400° C., and placed for 15 h under pure $H_2$ (reduction). The catalyst is treated again for 1 h at 450° C. under $H_2S/H_2$ (final sulfurization), and then placed again for 2 h under pure $H_2$ (removal of unreacted $H_2S$ chemisorbed on the reactive sites).

Reaction temperature: 450° C. under 1 atm of pure $H_2$, 100 ml/min and a constant pressure of pyridine of 4.25 torr, flow rate 1 to 6 µl/min.

Analysis in a stationary state.

The HDN reactivity is expressed in $10^{-11}$ moles of pyridine converted to hydrocarbons and ammonia per second and per gramme of catalyst.

The HDS reactivity referred to in Table I corresponds to the thiophene hydrodesulfurization reaction in the phase containing sulfur. The conditions for the HDS reaction are as follows:

Reaction carried out after the pyridine HDN reactions described earlier, that is to say using catalysts which have undergone the pre-sulfurization treatment.

The reaction temperature is 275° C. under 1 atm of $H_2$, flow rate of 100 to 250 ml/min, constant thiophene pressure of 6 torr, flow rate of 1 to 6 µl/min in order to maintain equivalent conversions for all the catalysts. Measurements carried out in the stationary state.

The HDS activity is expressed in $10^{-11}$ moles of thiophene converted per second and per gram of catalyst.

It should be noted that the last two catalysts, namely NMX and CMX have been doped with molybdenum. According to a particular feature of the present invention, the catalysts may in fact be doped with 0.2 to 3.5% by weight of molybdenum. These catalysts are produced, for example, by co-impregnation of the support with the aid of a solution of uranyl acetylacetonate and molybdenum acetylacetonate $MoO_2$ (Acac)$_2$.

It will also be observed that the mean rate of HDN diminishes for all the catalysts, compared to that of the reaction with the oxide phase; however, this reduction in the rate of HDN is approximately 5 times smaller in the case of the catalysts according to the invention than for the conventional catalysts based on nickel and molybdenum. The catalysts according to the invention are therefore considerably more resistant towards the phenomenon of poisoning due to sulfur. Furthermore, it has been observed that the HDN reactivity of the uranium-based catalysts according to the invention in a phase containing sulfur increases as a function of the nickel content. A similar change is not observed in the case of conventional catalysts based on nickel and molybdenum.

Finally, it is found that the HDS reactivity is improved by doping catalysts according to the invention with molybdenum.

The last two columns of the table show the HDN and HDS reactivities based on 1 g of active phase, that is to say to 1 g of $MoO_3+NiO$. These HDN and HDS reactivities are expressed in $10^{-11}$ moles, respectively, of pyridine and thiophene convertd per second and per gram of active phase.

TABLE 1

| Catalysts | Ni weight % | U weight % | Co weight % | Mo weight % | HDN reactivity | HDS reactivity | Reactivity based on 1 g of $MoO_3$ + NiO (active phase) | |
|---|---|---|---|---|---|---|---|---|
| | | | | | | | HDN | HDS |
| NX 320 AC | 2.41 | 16.24 | 0 | 0 | 131 | (—) | | |
| NX 412 AC | 3.72 | 12.03 | 0 | 0 | 135 | 7,060 | | |
| NX 512 AC | 5.35 | 11.77 | 0 | 0 | 308 | 8,400 | | |
| NX 712 AC | 7.26 | 11.59 | 0 | 0 | 347 | 10,020 | | |
| NiMo(N4) | 2.24 | 0 | 0 | 6.68 | (—) | 73,350 | (—) | 569,930 |
| NiMo(N12) | 2.20 | 0 | 0 | 7.44 | 259 | (—) | 1,854 | (—) |
| NiMo(N7) | 5.57 | 0 | 0 | 7.72 | 199 | 74,283 | 1,066 | 397,870 |
| NMX A | 2.92 | 11.53 | 0 | 3.41 | 220 | 27,200 | 2,500 | 125,350 |
| CMX A | 0 | 11.53 | 2.73 | 3.41 | 323 | 15,170 | 3,660 | 67,540 |
| NMX B | 0.5 | 10 | 0 | 2 | 274 | 18,890 | 7,538 | 519,610 |
| CMX B | 0 | 10 | 0.5 | 2 | 256 | 7,000 | 7,050 | 192,350 |

(—) not determined

What is claimed is:

1. Catalyst for the hydrotreatment of hydrocarbons which incorporates a refractory inorganic support combined with an active phase comprising a layer of uranium oxide and at least one oxide of a group VIII metal, wherein said active phase comprises a layer of uranium oxide fixed with a homogeneous distribution on said support through the intermediacy of direct —O— bonds resulting from an impregnation of the support with an ethanolic solution of uranyl acetylacetonate.

2. Catalyst as claimed in claim 1, wherein the said Group VIII metal is chosen from iron, cobalt, nickel and ruthenium.

3. Catalyst as claimed in claim 2 which contains 5 to 35% by weight of uranium, based on the total weight of the catalyst.

4. Catalyst as claimed in claim 3 which contains 0.1 to 10% by weight of iron, cobalt, nickel and/or ruthenium, based on the total weight of the catalyst.

5. Catalyst as claimed in claim 4 wherein is doped with 0.2 to 2% by weight of an oxide of rare earths based on the total weight of the catalyst.

6. Catalyst as claimed in claim 5 which is doped with 0.2 to 3.5% by weight of molybdenum, based on the total weight of the catalyst.

7. A process for preparing a catalyst as claimed in one of claims 1, 2, 3, 4, 5 or 6, comprising:
depositing a catalyst comprising a compound of a Group VIII metal and uranium on a refractory inorganic support by impregnating said support with said uranium with the aid of an anhydrous ethanolic solution of uranyl acetylacetonate and impregnating said refractory inorganic support with a solution containing said Group VIII metal;
drying the impregnated refractory inorganic support; and
calcining the impregnated refractory inorganic support to form oxides of said uranium and said Group VIII metal.

8. A process as claimed in claim 7, wherein said uranyl acetylacetonate is obtained by reacting uranyl nitrate with acetylacetone and precipitating the uranyl acetylacetonate by the addition of a carbonate.

9. A process as claimed in claim 8 wherein the refractory inorganic support carries acidic hydroxyl groups.

10. A process as claimed in claim 9 wherein after the impregnation of the support the solid obtained by evaporation is dried between 100° and 200° C., and then roasted in air at between 400° and 600° C.

11. Catalyst as in claim 1 where said refractory inorganic support is γ-alumina.

12. Catalyst as claimed in claim 5 in which said rare earths are selected from the group consisting of cerium and samarium.

13. A process as in claim 8 in which said carbonate is potassium carbonate.

14. A process as in claim 9 where said solid obtained by evaporation is dried at approximately 120° C.

15. A process as in claim 8 in which said reaction of uranyl nitrate with acetylacetone is carried out in the presence of an excess of approximately 10% of acetylacetone.

* * * * *